United States Patent
Vannini et al.

(10) Patent No.: US 11,487,767 B2
(45) Date of Patent: Nov. 1, 2022

(54) AUTOMATED OBJECT CHECKLIST

(71) Applicant: International Business Machines Corporation, Armonk, NY (US)

(72) Inventors: Enrico Vannini, Rome (IT); Louise Suzanne Elliott, Sheffield (GB); Abdul Mumin Choudhury, Bristol (GB); Martin A. Ross, Gosport (GB)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 16/943,493

(22) Filed: Jul. 30, 2020

(65) Prior Publication Data
US 2022/0035822 A1 Feb. 3, 2022

(51) Int. Cl.
*G06F 16/00* (2019.01)
*G06F 16/2457* (2019.01)
(Continued)

(52) U.S. Cl.
CPC ...... *G06F 16/24575* (2019.01); *G06F 16/235* (2019.01); *G06F 16/2358* (2019.01); *G06K 9/6256* (2013.01); *G06N 20/00* (2019.01)

(58) Field of Classification Search
CPC .... G06F 21/316; G06F 21/53; G06F 21/6218; G06F 21/64; G06F 2221/2149; G06F 16/337; G06F 16/437; G06F 16/4393; G06F 16/48; G06F 9/505; G06F 16/235; G06F 16/2358; G06F 16/24575; G06F 16/16; G06F 16/287; G06F 16/289; G06F 16/122; G06F 16/245; G06F 16/24554;
(Continued)

(56) References Cited

U.S. PATENT DOCUMENTS 9,225,772 B2 * 12/2015 Lui .................. H04L 43/14
9,286,783 B1 3/2016 Teller et al.
(Continued)

FOREIGN PATENT DOCUMENTS

WO 2019036844 A1 2/2019

OTHER PUBLICATIONS

Anonymous, "Method and Process for Determining if All Objects Have Been Loaded Into a Vehicle," https://priorart.ip.com/IPCOM/000247816, an IP.com Prior Art Database, IP.com No. IPCOM000247816D, Oct. 6, 2016, 2 pgs.
(Continued)

*Primary Examiner* — Shyue Jiunn Hwa
(74) *Attorney, Agent, or Firm* — Peter K. Suchecki

(57) ABSTRACT

Provided is a method, computer program product, and system for building an object checklist used to predict which objects should accompany a user during an occasion. A processor may monitor observation data related to the user from an observation device. The processor may analyze the observation data to identify an object associated with the user. The processor may collect contextual data related to the identified object and the user. The processor may compare the contextual data to a usage pattern threshold related to the identified object and one or more other objects. In response to the usage pattern threshold being met, the processor may output an alert to the user. The alert may indicate that an exception to a usage pattern related to the identified object has occurred.

19 Claims, 9 Drawing Sheets

(51) Int. Cl.
*G06F 16/23* (2019.01)
*G06N 20/00* (2019.01)
*G06K 9/62* (2022.01)

(58) Field of Classification Search
CPC .............. G06F 16/951; G06F 2201/80; G06F 16/90335; G06F 16/904; G06F 2111/10; G06F 30/20; G06F 1/163; G06F 11/0793; G06F 11/3068; G06F 11/3072; G06F 16/258; G06F 16/958; G06F 3/00; G06F 3/011; G06F 3/017; G06F 8/71; H04N 21/41265; H04N 21/4223; H04N 21/44218; H04N 21/44231; G06K 9/6256; G06N 20/00
See application file for complete search history.

(56) References Cited

U.S. PATENT DOCUMENTS

| | | | | |
|---|---|---|---|---|
| 10,389,592 | B2* | 8/2019 | Lui | ............... H04L 41/0886 |
| 2008/0155422 | A1* | 6/2008 | Manico | ............... G11B 27/031 |
| | | | | 715/731 |
| 2009/0307176 | A1* | 12/2009 | Jeong | ............... G06F 16/337 |
| | | | | 706/52 |
| 2015/0128156 | A1* | 5/2015 | Zhu | ............... G06F 11/302 |
| | | | | 719/328 |
| 2016/0360336 | A1* | 12/2016 | Gross | ............... H04W 4/025 |
| 2018/0233011 | A1 | 8/2018 | Conti et al. | |
| 2019/0201119 | A1* | 7/2019 | Harris | ............... A61B 34/35 |
| 2019/0349728 | A1* | 11/2019 | Oppenheimer | ............... H04W 4/33 |
| 2020/0057487 | A1* | 2/2020 | Sicconi | ............... G06T 7/254 |

OTHER PUBLICATIONS

Anonymous, "System to Automatically Create a Carry on Objects—List Based on the Mobile Device Calendar Application," https://priorart.ip.com/IPCOM/000219428, an IP.com Prior Art Database, IP.com No. IPCOM000219428D, Jun. 290, 2012, 3 pgs.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

US 11,487,767 B2

AUTOMATED OBJECT CHECKLIST

BACKGROUND

The present disclosure relates generally to the field of artificial intelligence, and more specifically to building an automated object checklist for predicting objects that should accompany a user during an occasion.

In many instances, a user may leave their home without one or more objects needed for an event. For example, a user may be planning to play tennis with a friend but forget to take their tennis racket with them when leaving their home. This may result in the user having to cancel the event or waste time returning to their home to obtain the forgotten object which can be an inconvenience.

SUMMARY

Embodiments of the present disclosure include a method, computer program product, and system for building an object checklist used to predict which objects should accompany a user during an occasion. A processor may monitor observation data related to the user from an observation device. The processor may analyze the observation data to identify an object associated with the user. The processor may collect contextual data related to the identified object and the user. The processor may compare the contextual data to a usage pattern threshold related to the identified object and one or more other objects. In response to the usage pattern threshold being met, the processor may output an alert to the user. The alert may indicate that an exception to a usage pattern related to the identified object has occurred.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
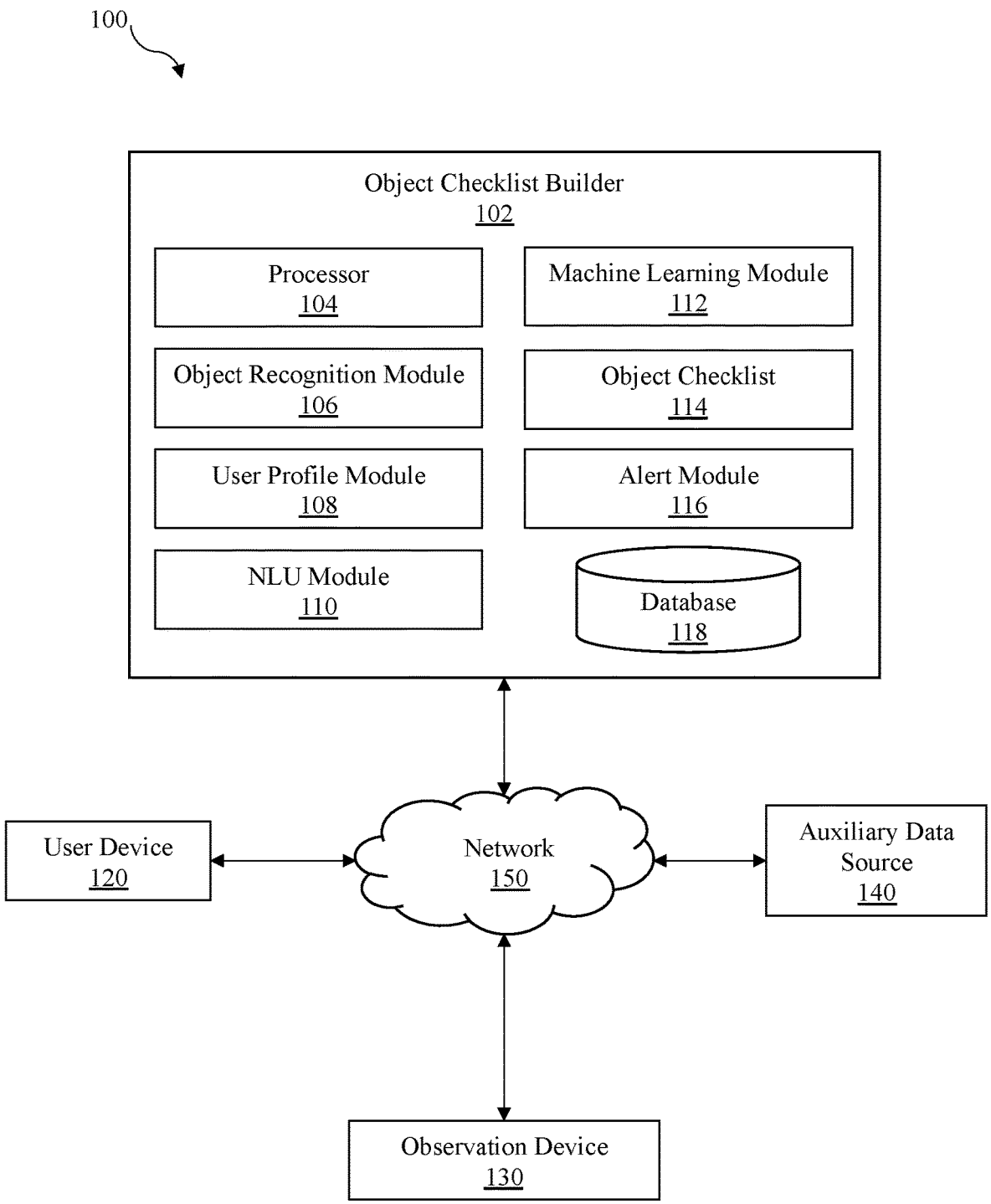
FIG. 1 illustrates a block diagram of an automated object checklist system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of artificial intelligence, and more particularly to building an automated object checklist for predicting objects that should accompany a user during an occasion. While the present disclosure is not necessarily limited to such applications, various aspects of the disclosure may be appreciated through a discussion of various examples using this context.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the present disclosure relate to a system that utilizes machine learning to determine behavioral patterns of a user related to carrying one or more objects. The system may build an automated object checklist and/or knowledgebase used for tracking objects that are related to each other based on analyzing training observation data of a user over a time period. For example, the system will learn user habits by observing what objects the user typically carries with them when leaving the home, analyze the user's social activity from various data sources (e.g., social media, calendar data, etc.), and identify a correlation between the objects the user typically carries with them on any given occasion. Once the system has learned the behavioral patterns of the user with respect to carrying the objects, the system may alert the user if an exception to a usage pattern for one or more objects is identified. For example, the system may identify that the user is carrying object A while leaving their home, analyze a set of conditions to determine if the user should also be carrying object B, and if the conditions are not met, warn the user that they are missing object B. The system may continuously learn and update the knowledgebase and/or the conditions to account for changes in the user's behavioral patterns over time with respect to the various objects.

In embodiments, the system may be initially trained by collecting a set of training observation data related to the user from an observation device. The observation device may be any type of device that can be used to detect the presence of an object in relation to the user. For example, the observation device may be one or more Internet of Things (IoT) cameras that are positioned strategically around an environment (e.g., a home, a car, a workplace, etc.) to observe the user. In another example, the observation device may be a radio frequency identification (RFID) system that can detect an RFID tag related to an object. The set of training observation data may be any type of data generated from the observation device. For example, the observation data may include image data, RFID data, metadata, audio data, and the like.

In embodiments, the set of training observation data may be collected over a predetermined period of time (e.g., 1 week, 1 month, 60 days, etc.) and/or over a predetermined number of observations (e.g., 10 observations, 50 observations, etc.) in order to effectively train the system with an adequate data sample size. For example, the system may collect the set of training observation data over a 1-month period of time to determine what objects the user typically carries with them on any given occasion.

In embodiments, the system may utilize a sliding training window that allows the system to continuously learn new habits with respect to various objects accompanying the user. For example, the training observation data may be continuously collected and updated over a sliding time period window of 60 days to continuously learn about the user. For example, training observation data of the user collected in December regarding carrying various objects (e.g., gloves, hats, scarf, etc.) may be different than training observation data collected in June (e.g., sunglasses, beach towel, beach chair, etc.).

Once the set of training observation data is collected, the system may analyze the observation data to identify a set of objects associated with the user on various occasions. For example, the system may use image recognition algorithms to analyze image data from the set of IoT cameras to identify the presence of objects accompanying the user on each day during the training period. In another example, the system may analyze RFID data to determine what objects the user is carrying with them when RFID tagged objects are detected by an RFID reader.

In embodiments, the objects can be any type of thing that accompanies the user on a given occasion. For example, the object can be an item (e.g., car keys, dog leash, gym bag, tennis racket, bike helmet, and the like) and/or a living thing (e.g., person, animal, plant, etc.) that is associated (e.g., carried, near, in a proximity to the user, etc.) with the user. In some embodiments, the user may be identified as the object. The system may analyze the observation data to identify and differentiate between one or more objects accompanying the user on each occasion during the training period. For example, on a first occasion the system may identify that the user is leaving their home with a friend while carrying a tennis racket and gym bag via image recognition, while further identifying the presence of a set of car keys carried by the user through an associated RFID tag. While on a second occasion, the system may identify that the user is alone and carrying a laptop bag (using image recognition) and the set of car keys (using the RFID tag). In this way, the system can identity each object carried by the user on each respective occasion.

Once the set of objects are identified from the set of training observation data, the system may collect a set of contextual data related to the identified set of objects and the user. For example, the system may collect timestamp data for when each object was observed with the user. Returning to the previous example, the system may record that the tennis racket, the gym bag, the car keys, and the user's friend were all observed with the user at around 5 pm on Mondays during the training period, while the laptop bag and the set of car keys were routinely identified by the system roughly around 8 am, Monday through Friday. The system may collect and analyze other contextual data related to the user and/or the identified objects through auxiliary data sources (e.g., calendar data, social media, weather data, text messages, user conversations, etc.). For example, the system may use natural language understanding (NLU) to analyze the user's calendar information from a smart phone and determine that the user typically plays tennis with their friend on Mondays at 5:15 pm based on a reoccurring calendar event.

Once the set of contextual data is collected, the system may correlate a connection between the identified set of objects and the set of contextual data to determine a usage pattern for each of the identified objects during the training period. Using machine learning techniques, the system may utilize the training observation data, the identified objects, and the contextual data to compare and correlate different data permutations in order to build usage pattern thresholds about each object and the user's behavior with respect to that object. In embodiments, the system may utilize an object checklist/knowledgebase that tracks associations and/or connections between the identified objects and the contextual data. The object checklist may be used by the system for determining various usage patterns of the objects in relation to each other.

For example, the system may identify that every Monday at 5 pm the user should be observed with the user's friend, gym bag, tennis racket, and keys, if contextual information from the user's calendar indicates the user is scheduled to play tennis. Alternatively, based on previous observation data and contextual data from the user's calendar, the system may determine the user will not be observed with those objects if the user's calendar is blank on Monday and/or if weather data collected from a weather service website indicates it is raining.

Once the correlation between objects and the contextual data is determined, the system may generate a set of usage pattern thresholds for each of the identified set of objects related to the user and/or the other identified objects. The system may determine the usage pattern thresholds based on relationships between objects that are associated together by utilizing the object checklist. The system may use a scoring model to provide scoring values to various objects on the checklist based on the usage pattern between that object, other objects, and the user's behavioral patterns using machine learning. For example, the usage pattern threshold may be based on a set of scores (e.g., the percentage of time the object is associated with other identified objects, relevance the object has as related to the user's schedule, etc.) that indicate how often the object is observed with other objects. As more objects are observed together, the relationships between those objects will be given a higher score and the system will become more reliable in predicting which objects (e.g., missing objects, extra objects, etc.) the user should be carrying based on other objects observed with the user on the given occasion. The usage pattern thresholds may be generated using the scoring model, such that when a usage pattern threshold related to identified object is met or exceeded (e.g., indicating another object associated with that identified object is missing/not accompanying the user), an alert is outputted to the user that an exception to the usage pattern related to the object has been identified.

Returning to the previous example, the system may generate a usage pattern threshold for the tennis racket based on the association between the tennis racket, the user's friend, the gym bag, and the car keys in relation to contextual data that was analyzed from previous observations during training. For example, the usage pattern threshold for the tennis racket may be scored such that any time the user is observed with the tennis racket, the system will attempt to identify other associated objects such as the user's friend and the gym bag because those objects are typically observed with the tennis racket based on previous training observation data (e.g., 75% of the time when the tennis racket has been observed). However, the car keys may not trigger a usage pattern threshold when observed without the tennis racket, because the system has identified the car keys during other observations without the tennis racket (e.g., previous example of the user going to work with only car keys and laptop bag).

In embodiments, the usage pattern threshold may utilize weighted scoring based on the relevance of the contextual data. For example, the usage pattern threshold for the tennis racket may be adjusted for exceptions such as when weather data indicates that there is rain in the forecast. For example, if the system collects contextual data from a weather service website indicating that it may rain and observes the user with the gym bag, the user's friend, and the car keys only, the system may not alert the user because it is unlikely the user plans to play tennis in the rain (e.g., based on previous correlation of training observation data and contextual data of the user canceling tennis when it rains).

Once the system has been trained and the usage pattern thresholds have been generated for each of the identified objects, the system may continuously monitor current observation data related to the user from the observation device to determine if the user is missing and/or carrying an extra object on any given occasion.

In embodiments, the system may analyze the current observation data to identify which objects are currently with the user on the given occasion and compare those objects to the object checklist and the usage pattern thresholds associated with each object from the checklist. For example, the system may observe that the user is only carrying their car keys when leaving the user's home at 8 am on a Tuesday. Once the car keys are identified, the system will collect any relevant contextual data related to the car keys that may be used to determine whether the user is missing and/or carrying an extra object.

In embodiments, the system will then compare the contextual data to the usage pattern threshold that was generated for the car keys during training. The usage pattern threshold may be based, in part, on what other objects are associated with the car keys at any given time by using the object checklist, and/or further adjusted/weighted based on relevant contextual information. Returning to the previous example from above, during training the system identified the car keys as being associated with the laptop bag when observing the user leaving the house around 8 am on Mondays-Fridays. However, on the current occasion, only the car keys are identified. Using the collected contextual data (e.g., timestamp indicating 8 am on Tuesday) the system will identify that there is an exception to the normal usage pattern related to the car keys because the laptop bag has not been identified, thus triggering the usage pattern threshold.

In response to the usage pattern threshold being exceeded, the system may output an alert to the user indicating that an exception to the usage pattern related to the car keys has occurred. The alert may be any type of alert. For example, the alert may be audible alert, a text message, and/or an email sent to a user device notifying the user of the missing object. For example, the system may send a text message to the user's smart phone indicating that the user has forgotten their laptop bag. Alternatively, the system may output an audio alert (e.g., spoken content) indicating the user is missing the laptop bag. For example, the audio alert may be outputted through one or more associated speakers (e.g., smart speaker). In this way, if the user forgets their smartphone or does not have a smartphone, the system may still audibly alert the user about a forgotten item. In some embodiments, the system may be a standalone system configured to output alerts audibly through a speaker and/or through visual means using a user interface.

In some embodiments, the user(s) must opt into the system in order for the system to collect their information (e.g., observation data, contextual data, social media data, etc.), and the user may determine which other users (e.g., third party alerts through smartphone/smart speaker, second users, etc.) can output alerts to the user based on the collected data. For example, during an initialization process, the system may inform the user of the types of data that it will collect (e.g., image data of the user and respective objects, RFID data, etc.) and the reasons why the data is being collected. In these embodiments, the system will only start collecting the user information upon the user explicitly permitting the collection. Furthermore, the system may only collect the data that is necessary to provide alerts to the user regarding various objects. The data may be anonymized and/or encrypted while in use, and the data may only be maintained as needed for providing necessary actions. If the user chooses to opt out of the system, any user information previously collected may be permanently deleted.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of object checklist builder system 100, in accordance with embodiments of the present disclosure. In the illustrated embodiment, object checklist builder system 100 includes object checklist builder 102 that is communicatively coupled to user device 120, observation device 130, and auxiliary data source 140 via network 150. Object checklist builder 102, user device 120, and observation device 130 may be any type of computer system and may be substantially similar to computer system 1101 of FIG. 8. In embodiments, object checklist builder 102 may a standalone device (e.g., having its own user interface, audio output for alerts, etc.) or a virtualized application located on another computer system. For example, object checklist builder 102 may be a virtual application accessed by user device 120 through a cloud computing network, such as cloud computing environment 50 described in FIG. 9.

User device 120 may be any type of device (e.g., smart phone, smart speaker, smart vehicle, etc.) configured to communicate with and/or receive an alert from object checklist builder 102. For example, user device 120 may be a smart phone that receives an alert notification when object checklist builder 102 identifies that a user is missing an object that the user typically carries with them on the given occasion. In embodiments, object checklist builder 102 may collect contextual data from user device 120 to learn about the user with respect to various objects. For example, object checklist builder 102 may collect various behavioral information related to the user (e.g., through calendar information, text messages, etc.) such as scheduled events (e.g., a golf outing) and correlate those events with respect to identified objects (e.g., user observed with golf clubs).

Observation device 130 may be any type of device (e.g., IoT camera, RFID sensor, smart vehicle/home equipped with a set of cameras, smart speaker, etc.) that generates observation data related to the user. For example, observation device 130 may be a set of cameras that generate image data of a user carrying one or more objects on a given occasion. The observation data generated by observation device 130 may include various forms of contextual data (e.g., metadata) used by the object checklist builder 102 to gain information about the user and one or more identified objects. For example, observation data may include contextual data indicating when identified objects were observed with the user (e.g., day, date, time, etc.).

Auxiliary data source 140 may be any type of contextual data source (e.g., social media website, email account, cloud calendar information, weather forecast website, messaging service, etc.) used by the object checklist builder 102 to determine user patterns related to the user and one or more identified objects. For example, the auxiliary data source 140 may be a social networking website where the object checklist builder 102 gathers information about what the user is doing on a given occasion (e.g., through a social media post by the user stating, "Anyone want to come biking with me this weekend?"). In another example, the auxiliary data source 140 may be a cloud-based calendar where the object checklist builder 102 gathers information about the user by analyzing the user's schedule and makes connections between various objects associated with the user. In embodiments, information gathered from auxiliary data source 140 may be analyzed by the object checklist builder 102 using natural language understanding (NLU) module 110.

Network 150 may be any type of communication network, such as a wireless network or a cloud computing network. Network 150 may be substantially similar to, or the same as, cloud computing environment 50 described in FIG. 9. In embodiments, network 150 can be implemented using any number of any suitable communications media. For example, the network may be a wide area network (WAN), a local area network (LAN), a personal area network (PAN), an internet, or an intranet. In certain embodiments, the various systems may be local to each other, and communicate via any appropriate local communication medium. For example, object checklist builder 102 may communicate with user device 120, observation device 130, and auxiliary data source 140 using a WAN, one or more hardwire connections (e.g., an Ethernet cable) and/or wireless communication networks. In some embodiments, the various systems may be communicatively coupled using a combination of one or more networks and/or one or more local connections. For example, object checklist builder 102 may communicate with observation device 130 using a hardwired connection, while communication between user device 120, auxiliary data source 140, and object checklist builder 102 may be through a wireless communication network.

In the illustrated embodiment, object checklist builder 102 includes processor 104, object recognition module 106, user profile module 108, NLU module 110, machine learning module 112, object checklist 114, alert module 116, and database 118.

In embodiments, object recognition module 106 is configured to identify one or more objects associated with the user by analyzing observation data generated from observation device 130. For example, object recognition module 106 may include image recognition algorithms used to identify various objects accompanying the user from image data collected from an IoT camera. In another example, object recognition module 106 may identify various objects accompanying the user through the detection of one or more RFID tags associated with the objects. In embodiments, object recognition module 106 may identify the user through various recognition means. For example, object recognition module 106 may identify the user through image recognition (e.g., facial recognition) and/or an RFID tag associated with the user (e.g., RFID tag on the user's keys, wallet, etc.) to determine which usage pattern thresholds to apply for the respective identified user.

In embodiments, user profile module 108 is configured to generate a user profile associated with the user. The user profile may contain and/or track user patterns/usage pattern with respect to various objects accompanying the user on any given occasion. The user profile may be stored on database 118 of object checklist builder 102 and/or user device 120. The user profile may utilize a central registration identifier to manage all user devices 120 owned by the user such that they may be associated with object checklist builder 102. The user profile may include various social identifiers (e.g., email, social media account names, contact information) that allow object checklist builder 102 to collect contextual data about the user from auxiliary data source 140. Further, the social identifiers included in the user profile allow object checklist builder 102 to automatically output various alerts (e.g., notification that the user is missing an object/carrying an extra object, etc.) to the user through associated user device 120. For example, checklist builder 102 may send various alerts directly to the user's smart phone via email, pop-up notification, and/or text.

In embodiments, NLU module 110 may collect, monitor, and/or analyze contextual data (e.g., calendar data, social media posts, comments, spoken content, unstructured data, etc.) from user device 120, observation device 130, and/or auxiliary data source 140 to determine behavioral patterns and/or trends related to the identified object(s). For example, NLU module 110 may analyze timestamps and/or location information from image data collected from observation device 130, calendar entries collected from user device 120, and social media posts collected from auxiliary source 140 to determine a usage pattern related to an identified object. For example, NLU module 110 may analyze unstructured data from a user's calendar entry indicating the user is playing golf with a friend on Sunday at 8 am, while further collecting timestamp data from an image of the user leaving their home with golf clubs and the friend around 7:30 am. This information may be utilized by the system to make correlations between the user's calendar information and the identified objects (e.g., golf clubs, the user, the user's friend) to determine specific usage patterns over a period of time/observation (e.g., reoccurring entries for scheduled golf with the same friend). In embodiments, NLU module 110 may be substantially similar to the natural language understanding system 712 of FIG. 7.

In embodiments, machine learning module 112 may collect, monitor, and/or analyze data (e.g., observation data and/or contextual data) received from user device 120, observation device 130, and/or auxiliary data source 140 to determine usage patterns of the user with respect to the identified objects. Machine learning module 112 may utilize object checklist 114 to track and/or correlate which objects were identified accompanying the user on any given occasion. Using the object checklist 114, the system may determine which objects the user should likely be carrying on specific occasions and alert the user if there is an exception to the usage pattern for the given object(s).

In embodiments, machine learning module 112 may continuously monitor observation data and contextual data related to the identified objects and the user to recognize patterns of user behavior. When anomalies in the user behavior related to the object are detected, the system may alert the user. In embodiments, the system may detect anomalies by comparing the collected data to respective usage pattern thresholds related to identified objects. If the usage pattern threshold has been exceeded for a given object the system will alert the user. In embodiments, the system may alert the user using alert module 116. For example, alert module 116 may automatically send an alert to user device 120 if a usage pattern threshold related to an object has been exceeded.

In embodiments, machine learning module 112 can utilize machine learning and/or deep learning, where algorithms or models can be generated by performing supervised, unsupervised, or semi-supervised training on historical observation data and/or historical contextual data in conjunction with user input to correlate the accuracy of outputting various alerts in order to properly alert the user when forgetting and/or carrying additional objects.

For example, machine learning module 112 may utilize logical regression, decision tree classification, or support vector machine-based classification to determine which alerts were correct (e.g., the user provided input verifying they have forgotten an object, the user verified the presence of an extra object, etc.) when alerting the user of an exception related to the usage pattern for an identified object. Over time, machine learning module 112 can analyze the results to accurately predict when to properly alert the user of the exception based on adjusting various usage pattern thresholds. In this way, object checklist builder 102 may continuously improve the accuracy of appropriately alerting the user when they are missing an object and further reduce inaccurate alerts based on detection error.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

FIG. 1 is intended to depict the representative major components of the automated object checklist builder system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with the automated object checklist builder system 100 may not be present, and the arrangement of components may vary.

For example, while FIG. 1 illustrates an example automated checklist builder system 100 having an object checklist builder 102, a single user device 120, a single observation device 130, and a sing auxiliary data source 140, suitable network architectures for implementing embodiments of this disclosure may include any number of object checklist builders, user devices, observation devices, and auxiliary data sources. The various models, modules, systems, and components illustrated in FIG. 1 may exist, if at all, across a plurality of object checklist builders, user devices, observation devices, and auxiliary data sources.

Figure 2:
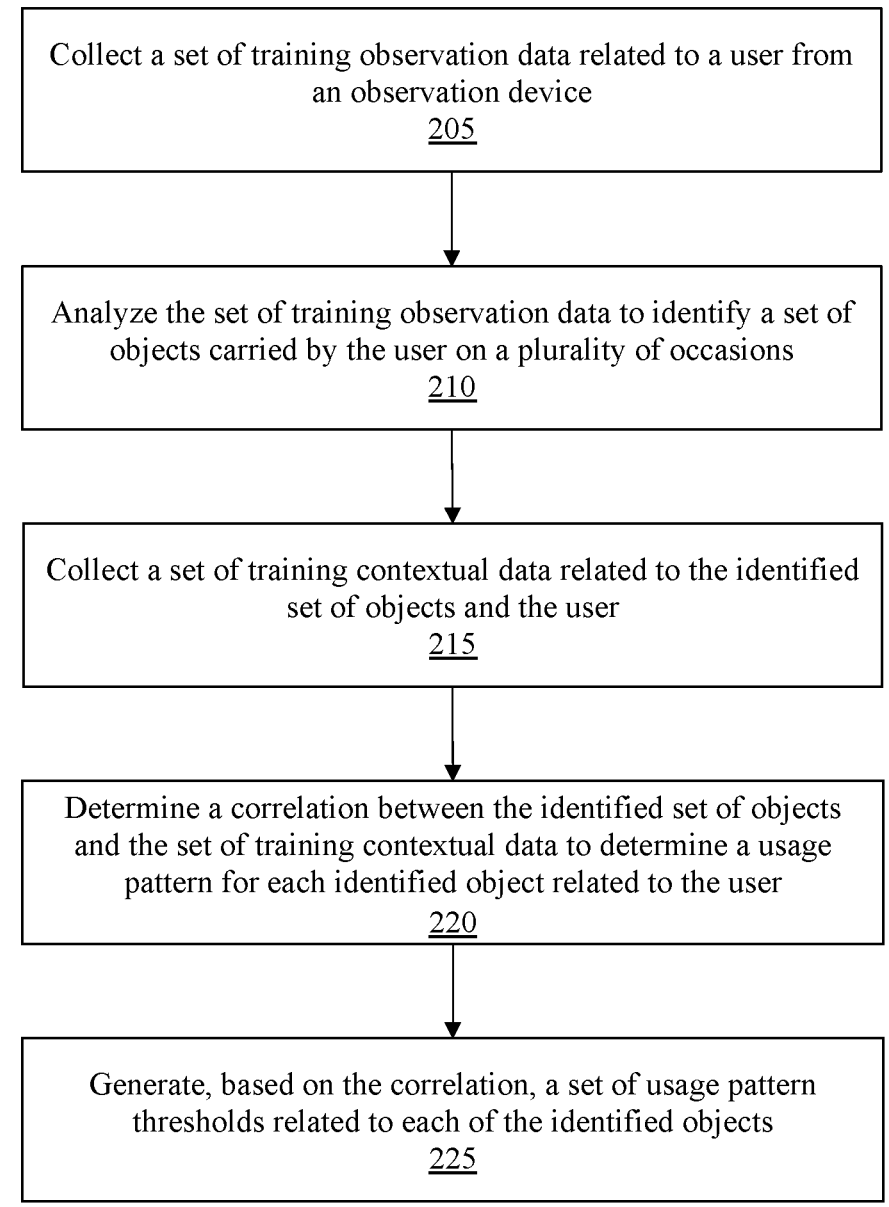
FIG. 2 illustrates a flow diagram of an example process for training the automated object checklist system, in accordance with embodiments of the present disclosure.

Referring now to FIG. 2, shown is a flow diagram of an example process 200 for training the automated object checklist system, in accordance with embodiments of the present disclosure. The process 200 may be performed by processing logic that comprises hardware (e.g., circuitry, dedicated logic, programmable logic, microcode, etc.), software (e.g., instructions run on a processor), firmware, or a combination thereof. In some embodiments, the process 200 is a computer-implemented process. The process 200 may be performed by processor 104 exemplified in FIG. 1.

The process 200 begins by collecting a set of training observation data related to a user from an observation device. This is illustrated at step 205. In embodiments, the observation device may be any type of device that generates observation data (e.g., IoT camera, RFID reader, smart speaker, etc.).

The set of training observation data may be any type of data used to identify one or more objects accompanying the user on a given occasion during a training period. For example, a first training observation data set may be image data collected from an IoT camera of the user carrying a bike helmet and a water bottle on a first occasion, while a second training data set may be image data of the user carrying a dog lease while accompanied by a dog on a second occasion.

The process 200 continues by analyzing the set of training observation data to identify a set of objects associated with the user on a plurality of occasions. This is illustrated at step 210. For example, the system may analyze the training observation data from the IoT camera using image recognition algorithms to identify various objects associated with the user during each occasion. For example, the system may identify that the user is holding the water bottle and wearing the bike helmet on the first occasion. While on a second occasion the system may identify the dog leash using image recognition and the presence of the dog through an RFID chip associated with the dog's collar. In embodiments, once each object is identified, the system may create an object checklist based on which items are associated/carried with each other on any given occasion over the training period.

The process 200 continues by collecting a set of contextual data related to the identified set of objects and the user. This is illustrated at step 215. In embodiments, the contextual data may be any type of data (e.g., timestamp data, weather condition data, calendar data, textual data related to the user, location data, metadata, and the like) used to determine a behavioral/usage pattern related to the identified object(s) and the user.

In embodiments, the contextual data may be behavioral data regarding the user's schedule collected from an auxiliary data source (e.g., calendar information from user's smart phone, social media posts describing an activity the user plans to do, etc.). For example, the system may analyze events in the user's calendar indicating that the user plans to go bike riding on the weekend. In another example, the system may collect and analyze unstructured data from a social media post written by the user to a second user indicating they plan to go bike riding on a certain occasion together. Analyzing the contextual data allows the system to gain insights on the relationship of the user's behavioral pattern in relation to the identified objects associated with the user.

The process 200 continues by determining a correlation between the identified set of objects and the set of contextual data to determine a usage pattern for each identified object related to the user. This is illustrated at step 220. In embodiments, the system learns to identify which objects are connected (e.g., related) to each other based on the correlation between the identified objects and the collected contextual data related to the user. The system may determine which objects are often observed together over the training period and which objects are not.

For example, using the training data, the system may determine that the user is always observed with the bike helmet and the water bottle on weekends, while observations of the user with the dog leash and the dog are generated daily. Further, the system may determine that the bike helmet and water bottler are never observed with the dog leash and the dog. The system may adjust those connections when collecting further observation data and/or contextual data that indicates a change or exception in the usage pattern. For example, the system may observe the user wearing a raincoat when holding the dog leash while accompanied by the dog when contextual data collected from a weather service indicates rain. In this way, the usage pattern related to the dog leash and dog may be adjusted based on contextual weather data, such that whenever the system identifies that the weather is rainy and observes the user with the dog leash and dog, then the system should observe the user wearing the rain coat, and if not, the system will alert the user that they are missing the rain coat.

In some embodiments, the contextual data may include spoken contextual data collected from the user that may be further correlated to the user's behavior with respect to the usage pattern for each object. For example, the system may collect spoken content from a microphone (e.g., smart speaker) that picks up the sound of the user's voice asking the dog if it wants to go for a walk. The system may correlate the spoken content of the words "go for a walk" with the image data of the dog and/or dog leash, such that if the system identifies those words spoken by the user on an occasion, then the usage pattern would indicate the user should be observed with the dog and the dog leash.

The process 200 continues by generating, based on the correlation, a set of usage pattern thresholds for each of the identified set of objects related to the user. This is illustrated at step 225. The usage pattern threshold may be any type of threshold, such as a range, minimum or maximum, or exact value. In embodiments, the system may generate a usage pattern threshold that is specific for each of the identified objects that were observed over the training period.

Returning to the previous examples, the system may generate separate usage pattern thresholds for each of the bike helmet, water bottle, dog leash, dog, and raincoat based off of the training data. For example, the bike helmet may include a usage pattern threshold that when exceeded alerts the user that they have forgotten the water bottle (e.g., based on observation data showing only the user wearing the bike helmet).

In embodiments, the usage pattern threshold may be adjusted based on contextual information related to the user. For example, the usage pattern threshold related to the water bottle may only trigger an alert by the system if the user is observed without the bike helmet and the user's calendar indicates the user is going bike riding that day. This may be because training observation data has observed the user carrying the water bottle on other occasions (e.g., days the user works out at the gym) without the presence of the bike helmet.

In embodiments, the correlation between objects may not be symmetric. For example, object A may be observed with object B, but that does not mean object B is always observed with object A. The system may observe that every time the user leaves home with object B, the user also brings object A, but not necessarily vice versa. Often times a user could leave home with object A and without object B. In this way, the system will warn the user if the user leaves with object B but not with object A, but it will not warn the user if they leave home with object A and not object B. The system may make these connections for any size set of objects. For example, the system may determine that a user brings object C with him whenever he has objects A and B, but that objects A and B are often individually brought on their own. Accordingly, the system will not send an alert to the user that he is forgetting object C if he is bringing object A by itself, or object B by itself, but an alert will be sent if objects A and B are being brought without object C.

In embodiments, the system may use any type of scoring model to score the analyzed data to generate the usage pattern thresholds. For example, the system may utilize a percentage based on the number of times each object was observed with one or more objects during training. The scoring may be adjusted based on the contextual data. For example, the scoring may be weighted based on the collected contextual data. For example, the usage pattern threshold for the connection between the bike helmet and the water bottle may include various weighted values when calendar data indicate the user has a scheduled biking event that day.

The usage pattern threshold may be associated with an alert that is sent to the user when the threshold is met or exceeded (e.g., when the likelihood that an object is being forgotten is greater than the threshold). For example, the alert may be an audio alert, a text message, email, and/or notification displayed on a user device. The alert may be any type of alert used to notify the user that an exception to the usage pattern of the identified object has occurred. In embodiments, the alert may be a notification used to inform the user that a second object related to the identified object(s) is missing, a second object unrelated to the identified object(s) has been detected, or that the identified object is not a common object typically associated with the user on a current occasion.

In embodiments, the set of usage pattern threshold may be continually updated/adjusted based on further analysis of historical observation data and historical contextual data. Returning to the previous example, if the user changes their biking habits to only bike on Wednesdays (e.g., based on further observation data and/or contextual data from the user's calendar) rather than the weekend, the system will adjust the usage pattern threshold for the bike helmet and water bottle, accordingly.

In some embodiments, the system may include a set of default usage pattern thresholds that are not based on training observation data and/or contextual data for instances where the system does not have enough data to determine appropriate alerts for notifying the user of an exception to the usage pattern. For example, the system may have a default threshold for car keys because standard users typically bring their car keys with them whenever they leave their house. In this way, the system may alert the user any time they leave the house without their car keys (e.g., detected through image data showing no keys present and/or no associated RFID data detected, etc.). Once the system has been trained and the set of usage pattern thresholds have been generated for the identified objects, the system may begin monitoring the user on a daily basis as described below.

Figure 3:
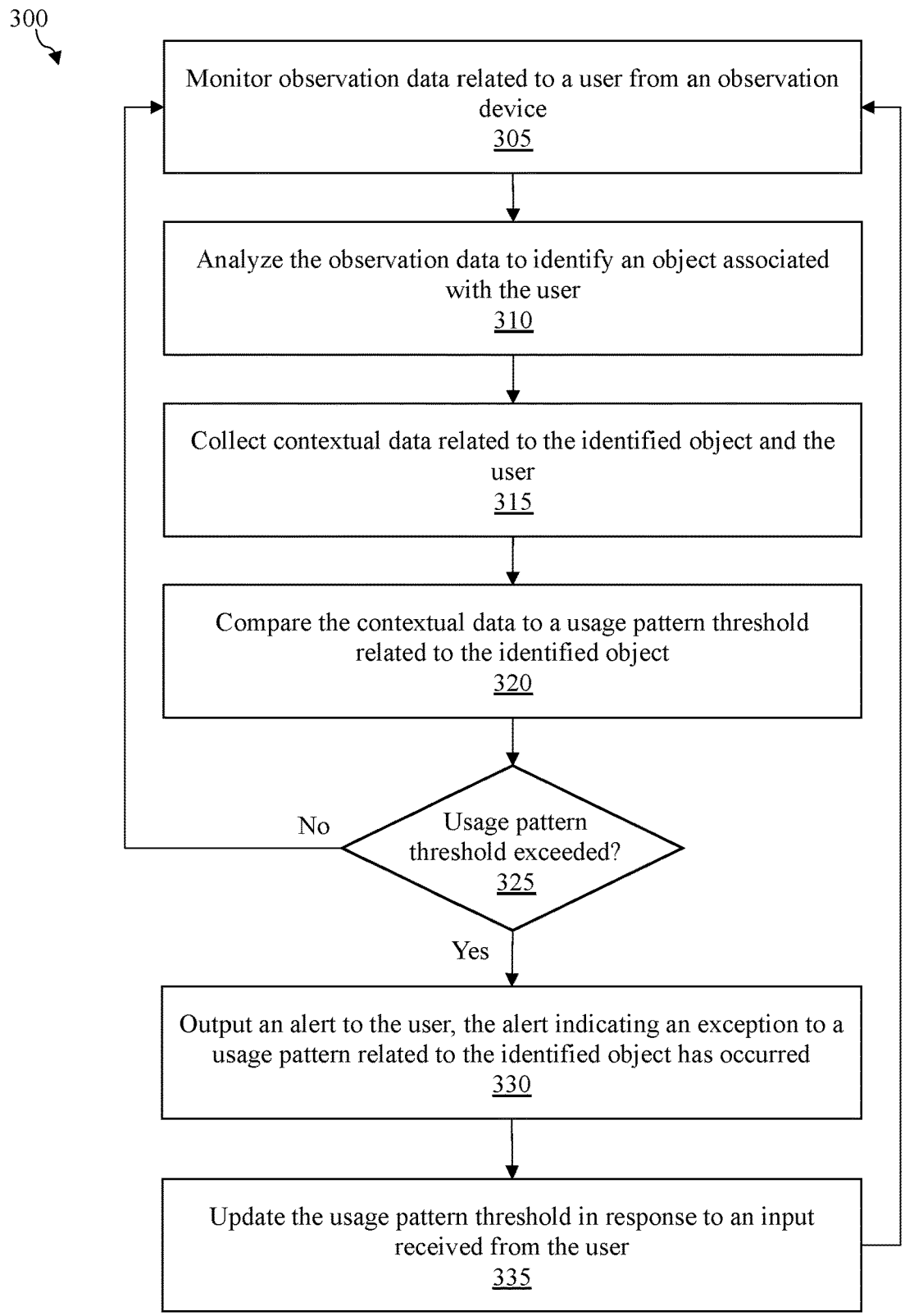
FIG. 3 illustrates a flow diagram of an example process for alerting a user when a usage pattern threshold has been exceeded, in accordance with embodiments of the present disclosure.

Referring now to FIG. 3, shown is a flow diagram of an example process 300 for alerting a user when a usage pattern threshold has been exceeded, in accordance with embodiments of the present disclosure. The process 300 may be performed by processing logic that comprises hardware (e.g., circuitry, dedicated logic, programmable logic, microcode, etc.), software (e.g., instructions run on a processor), firmware, or a combination thereof. In embodiments, process 300 may be, in addition to, or a subset of process 200. In embodiments, the process 300 is a computer-implemented process. The process 300 may be performed by processor 104 exemplified in FIG. 1.

The process 300 begins by monitoring current observation data related to a user from the observation device. This is illustrated at step 305. For example, the observation device may be an IoT camera that generates image data of a user leaving their home with a tennis racket, a set of car keys, and a gym bag on a current occasion.

The process 300 continues by analyzing the observation data to identify an object (or a set of objects) associated with the user. This is illustrated at step 310. The object may be any type of object (e.g., personal item, person, animal, etc.) associated with the user. Returning to the previous example, the system will analyze the image data of the user to identify each of the tennis racket, the set of car keys, and the gym bag.

The process 300 continues by collecting contextual data related to the identified object (or set of objects) and the user. This is illustrated at step 315. For example, the image data may include associated metadata that provides timestamp information regarding when the image was taken. For example, the timestamp information may indicate that the current image data was generated on Saturday at 1 pm. Additional contextual data may be collected from other auxiliary data sources. For example, on the current occasion weather service data may be collected that indicates the weather is currently sunny. Further, social media and calendar information may indicate the user plans to play tennis with a friend this Saturday at 1:15 pm.

The process 300 continues by comparing the contextual data to a usage pattern threshold related to the identified object (or set of objects). This is illustrated at step 320. If the usage pattern threshold is not exceeded ("No" at step 325), the process 300 will return to step 305 and continue to monitor observation data from the observation device. For example, the usage pattern threshold for each of the identified objects (e.g., the tennis racket, the gym bag, and the car keys) may be exceeded only if one or more of those objects are missing (e.g., as compared to the object checklist), there is an extra identified object, or if there is an exception identified from the contextual data. Here, if the current data is analogous to the training data used to generate each of the respective usage pattern thresholds, the thresholds will not be exceeded. For example, if during training the system always observed the user carrying the tennis racket, the gym bag, and the car keys on sunny days associated with a scheduled tennis event, the system will not alert the user of any exception to the usage pattern.

If the usage pattern threshold is exceeded ("Yes" at step 325), the process 300 will continue by outputting an alert to the user indicating that an exception to a usage pattern related to the identified object has occurred. This is illustrated at step 330. Returning to the previous example, if during training the system also observed the user carrying a can of tennis balls with the other identified objects, then there would be an exception to the usage pattern threshold and the system would alert the user that they are missing the can of tennis balls. In another example, the system may determine from contextual data collected from the weather service website that rain is in the forecast, such that an exception to the usage pattern threshold would be triggered. In this way the system may notify the user that it may rain which may affect their scheduled tennis event. In another example, the system may analyze a text message received from a second user cancelling the scheduled tennis event. The system may determine from the text message that an exception to the usage pattern threshold for the identified objects has occurred because the second user has canceled.

In embodiments, the alert can be in the form of any type of notification used to inform the user of the exception. Returning to the previous example, the alert may be a text message notification displayed on a user device indicating the user is missing the can of tennis balls.

In some embodiments, the process 300 continues by updating a usage pattern threshold in response to receiving an input from the user. This is illustrated at step 335. For example, the system may receive input from the user in response to the alert and analyze the input in relation to the usage pattern of the respective identified object(s). The input from the user may be used to verify that the alert was appropriate given the respective identified object. For example, in response to an alert notifying the user of a missing item (e.g., the can of tennis balls), the user may indicate (e.g., through text input, spoken content, selecting a choice from a question/survey regarding accuracy of the alert, etc.) to the system that the alert was correct and that the user had indeed forgotten the item.

Alternatively, in response to an alert notifying the user of an extra item, the user may indicate to the system that the user meant to bring the extra item based on a scheduled event. For example, the user may be observed bringing an extra tennis racket to a scheduled tennis event to be used by another player. The system may alert the user because there is an exception to the usage pattern related to the tennis racket. Once input is received from the user verifying the accuracy of the given alert, the system may update a usage pattern for the identified object accordingly. For example, the system may update the usage pattern threshold for the tennis racket to account for an extra tennis racket if this exception is to be a reoccurring in relation to tennis events. The system will adjust the usage pattern threshold to account for the extra tennis racket, such that on a scheduled tennis day the system will alert the user if they now forget the second tennis racket. In this way, the system may continually learn and/or update usage pattern thresholds as the user's use of objects changes.

Figure 4:
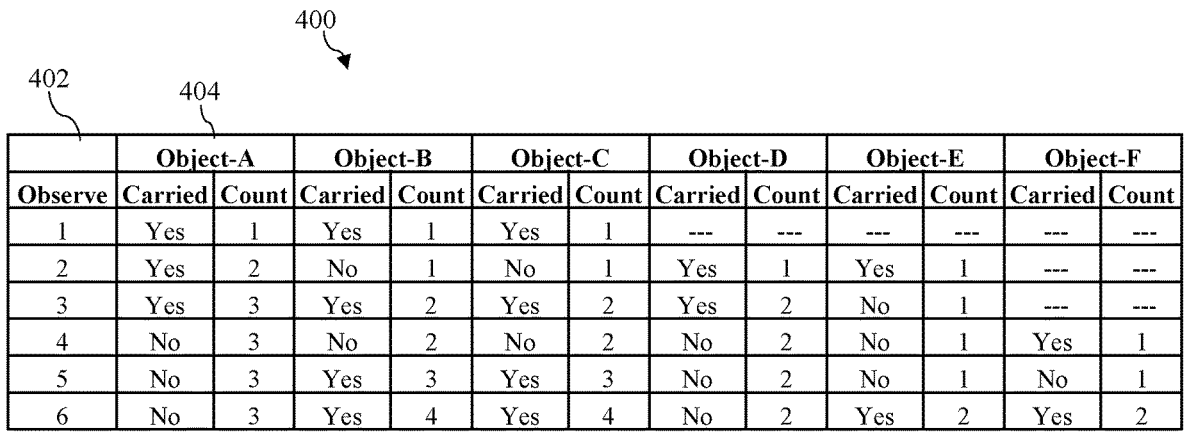
FIG. 4 illustrates an example observation table for a set of identified objects, in accordance with embodiments of the present disclosure.

Referring now to FIG. 4, shown is an example observation table 400 for a set of objects associated with a user, in accordance with embodiments of the present disclosure. In the illustrated embodiment, the observation table 400 includes a set of six observations 402 of which the user was observed associating (e.g., carrying) with objects 404 from an observation device. For each of the observations 402, the system identifies one or more objects 404 associated with the user. The observation table 400 includes six objects 404: Object-A, Object-B, Object-C, Object-D, Object-E, and Object-F. Each object 404 includes a "Carried" column and a "Count" column. A "Yes" in the carried column signifies the object 404 was observed by the system for that respective observation 402, while a "No" indicates the object was not observed for that respective observation 402. A number (e.g., 1, 2, 3, 4, etc.) in the count column indicates how many times the object 404 was observed respective to the amount of total observations. For example, Object-A was observed (e.g., carried by the user) during observations 1-3 (yes), but not observations 4-6 (no). For observations 1-3, Object-A was counted 3 total times, but zero times for observations 4-6. Thus, out of 6 observations 402, Object-A was observed 3 times. Further, the observation table 400 indicates which objects 404 were observed together with the user during each observation 402. For example, during the first observation 402, Object-A, Object-B, and Object-C were observed together with the user, while Object-D, Object-E, and Object-F were not observed. Once the observation data is gathered by the system for each observation 402, the data can be correlated with contextual data collected by the system to gain usage pattern insights about the user with respect to each object 404 as described in FIG. 5. It is noted that observation table 400 is only used as an example and is not meant to be limiting. In embodiments, the number of observations and/or objects may be increased or decreased depending on the design of the training model.

Figure 5:
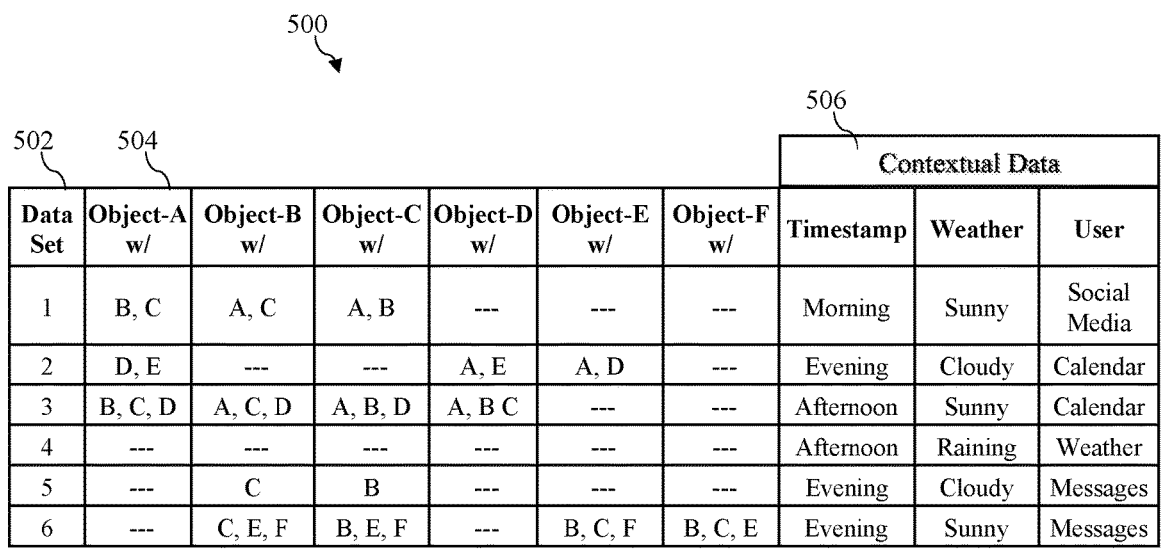
FIG. 5 illustrates an example correlation table for a set of identified objects, in accordance with embodiments of the present disclosure.

Referring now to FIG. 5, shown is an example relationship table 500 for a set of objects associated with a user, in accordance with embodiments of the present disclosure. In the illustrated embodiment, the relationship table 500 utilizes the observational data from observation table 400 and determines how each of the objects 504 are connected to each other with relation to the other objects and through various contextual data 506 collected by the system. For example, using the observational data set 502 the system may determine that Object-A has been observed accompanying the user 3 times out of 6. Of those 3 times, Object-A was observed with Object-B 2 times, Object-C 2 times, Object-D 2 times, Object-E 1 time, and Object-F zero times. After each observation, the system may compute a score or ranking for each association of objects 504 by determining how often each object is observed with the other objects and on which occasion. For example, the system may determine when Object-A is observed, under certain conditions (e.g., using contextual data 506), how often is Object-A identified with Object-B, and so on. The scoring may be based on a moving window of log events table that captures a predetermined time period (e.g., 1 month) or number of observations (e.g., 50 observations) that may capture the user's new habits. The system records information relating to each object and performs analysis after each observation to determine an object score based on its "with"/"without" associated objects as well as number of occurrences and other facts. After the observations are analyzed, the system will decide if it should warn the user for a possible forgotten item based on the data.

The simplified scenario outlines a possible data representation of the object checklist and how the data may be correlated with contextual data. It is contemplated that more observations (n) will result in more accurate predictions of which objects should be identified with each other on given occasions. Furthermore, while each example shown in FIG. 5 correlates individual objects, in some embodiments sets of objects may be correlated with one or more other objects or sets of objects. For example, if a user is carrying keys and a tennis racket on a sunny day, no alert may be generated since this is a normal occurrence. However, if the user is also accompanied by a friend, an alert may be generated if only a single tennis racket is being brought to remind the user that his friend also needs a racket. By correlating a set of objects (e.g., tennis racket and friend) with another object (e.g., second tennis racket), the system may be more accurate than if only one-to-one object comparisons were used.

Figure 6A:
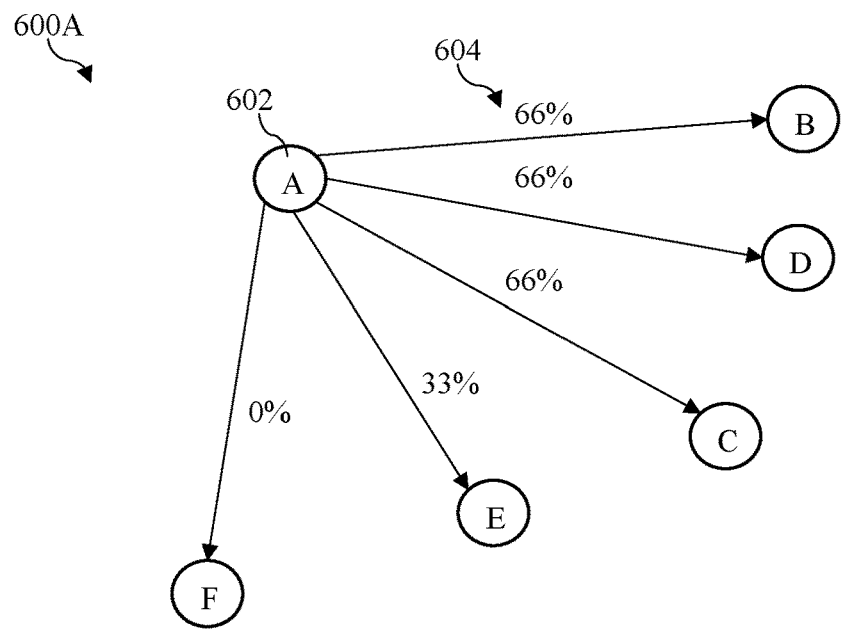
FIG. 6A and FIG. 6B illustrate example relationship graphs for Object-A and Object-B, respectively, in accordance with embodiments of the present disclosure.
Figure 6B:
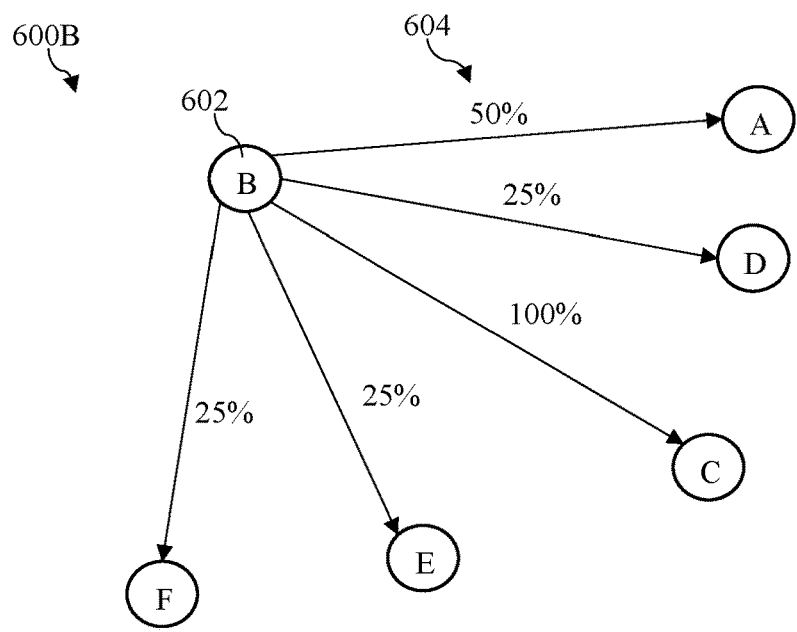

Referring now to FIG. 6A and FIG. 6B, shown are example object relationship graphs 600A and 600B for Object-A and Object-B, respectively, in accordance with embodiments of the present disclosure. It is noted that the object relationship graphs 600A and 600B are shown for example purposes only and do not include scoring related to contextual data, such as timestamps, weather related data, and or user events.

In the illustrated embodiments, object relationship graphs 600A and 600B depict each object as a node 602 and each edge report 604 as the score in relation to each object's relationship to other respective objects. For example, using the values from observation table 400 and the relationship table 500, the object relationship graph 600A for Object-A shows that Object-A was observed with Object-B, Object-D, and Object-C, 66% of the time (e.g., 2/3 times that Object-A was observed with the user). Meanwhile, Object-E was only observed with Object-A 33% (e.g., 1/3) of the time and Object-F 0% of the time.

In another example, the object relationship graph 600B for Object-B shows that Object-B was observed with Object-A 50% of the time (e.g., 2/4 times Object-B was observed with the user), Object-C 100% of the time (e.g., 4/4 times Object-B was observed with the user), and Object-D, Object-E, and Object-F 25% of the time (e.g., each 1/4 times Object-B was observed with the user).

In embodiments, the system may utilize the relationship graphs 600A and 600B to generate various user pattern thresholds (e.g., based on the 66% or 100% score, respectively) for determining when to alert a user regarding the objects. For example, the system may utilize relationship graph 600A to alert the user if Object-B, Object-C, or Object-D are missing when the user is observed with Object-A, but not when Object-E and Object-F are missing based on their score. In another example, the system may utilize relationship graph 600B to alert the user only when Object-C is missing when the user is observed with Object-B.

The examples above indicate that the relationship between objects is not reflexive. For example, Object-A is observed with Object-B 66% of the time using object relationship graph 600A while Object-B is only observed with Object-A 50% of the time using object relationship graph 600B. Depending on alert thresholds (66% vs. 50%), the system may only alert the user when Object-A is without Object-B, Object-D, and Object-C, and not alert the user when Object-B is without Object-A.

It is contemplated that various scoring techniques may be used to determine various scores/usage pattern thresholds and that the scoring may be weighted using additional data regarding the user (e.g., contextual data).

Figure 7:
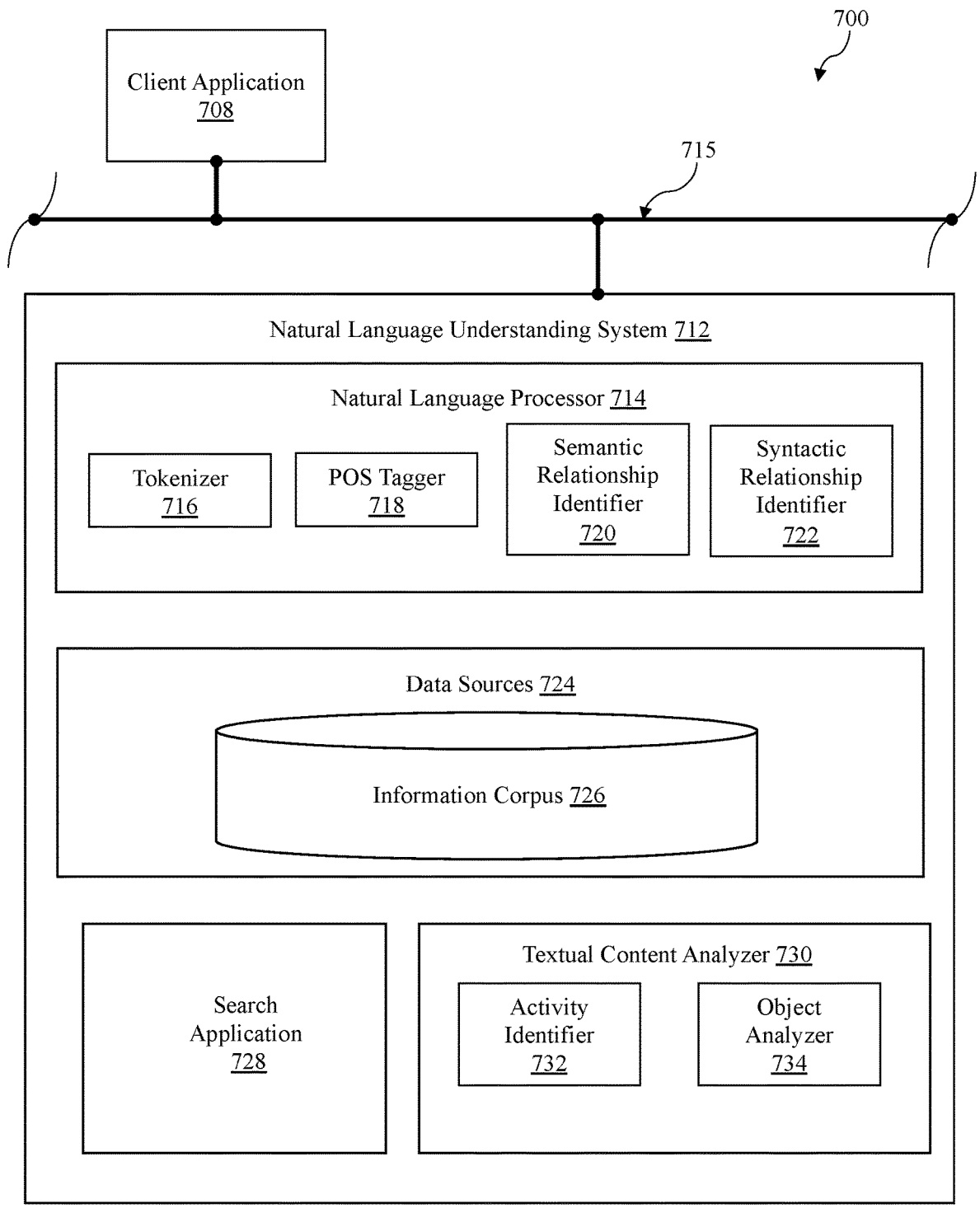
FIG. 7 illustrates a block diagram of an example natural language system configured to analyze contextual data, in accordance with embodiments of the present disclosure.

Referring now to FIG. 7, shown is a block diagram of an example natural language system 700 configured to analyze contextual data, in accordance with embodiments of the present disclosure. In embodiments, an object checklist builder (such as object checklist builder 102 of FIG. 1) may collect contextual data (e.g., unstructured data, text messages, spoken content, etc.) and send it in the form of unstructured textual documents/transcripts to be analyzed by the natural language system 700 which may be a standalone device, or part of a larger computer system. Such a natural language system 700 may include a client application 708, which may itself involve one or more entities operable to generate or modify information in the unstructured textual document(s) (e.g., analog or electronic textual content artifacts) that is then dispatched to a natural language understanding system 712 via a network 715.

Consistent with various embodiments, the natural language understanding system 712 may respond to the unstructured textual documents/transcripts sent by a client application 708. Specifically, the natural language understanding system 712 may analyze a received unstructured textual document (e.g., calendar entries, text messages, spoken content, etc.) to identify one or more terms associated with sentiment and emotion. In some embodiments, the natural language understanding system 712 may include a natural language processor 714, data sources 724, a search application 728, and a textual content analyzer 730. The natural language processor 714 may be a computer module that analyzes the received unstructured textual documents/transcripts. The natural language processor 714 may perform various methods and techniques for analyzing electronic documents (e.g., syntactic analysis, semantic analysis, emotional analysis, etc.). The natural language processor 714 may be configured to recognize and analyze any number of natural languages. In some embodiments, the natural language processor 714 may parse passages of the documents. Further, the natural language processor 714 may include various modules to perform analyses of the unstructured textual documents/transcripts. These modules may include, but are not limited to, a tokenizer 716, a part-of-speech (POS) tagger 718, a semantic relationship identifier 720, and a syntactic relationship identifier 722.

In some embodiments, the tokenizer 716 may be a computer module that performs lexical analysis. The tokenizer 716 may convert a sequence of characters into a sequence of tokens. A token may be a string of characters included in the unstructured textual documents/transcripts and categorized as a meaningful symbol. Further, in some embodiments, the tokenizer 716 may identify word boundaries in the unstructured textual documents/transcripts and break any text passages within the document into their component text elements, such as words, multiword tokens, numbers, and punctuation marks. In some embodiments, the tokenizer 716 may receive a string of characters, identify the lexemes in the string, and categorize them into tokens.

Consistent with various embodiments, the POS tagger 718 may be a computer module that marks up a word in passages (e.g., unstructured textual documents/transcripts) to correspond to a particular part of speech. The POS tagger 718 may read a passage or other text in natural language and assign a part of speech to each word or other token. The POS tagger 718 may determine the part of speech to which a word (or other text element) corresponds, based on the definition of the word and the context of the word. The context of a word may be based on its relationship with adjacent and related words in a phrase, sentence, or paragraph. In some embodiments, the context of a word may be dependent on one or more previously analyzed electronic documents. In embodiments, the output of the natural language understanding system 712 may populate a text index, a triplestore, or a relational database to enhance the contextual interpretation of a word or term. Examples of parts of speech that may be assigned to words include, but are not limited to, nouns, verbs, adjectives, adverbs, and the like. Examples of other part of speech categories that POS tagger 718 may assign include, but are not limited to, comparative or superlative adverbs, wh-adverbs, conjunctions, determiners, negative particles, possessive markers, prepositions, wh-pronouns, and the like. In some embodiments, the POS tagger 718 may tag or otherwise annotate tokens of a passage with part of speech categories. In some embodiments, the POS tagger 718 may tag tokens or words of a passage to be parsed by the natural language understanding system 712.

In some embodiments, the semantic relationship identifier 720 may be a computer module that may be configured to identify semantic relationships of recognized text elements (e.g., words, phrases) in documents. In some embodiments, the semantic relationship identifier 720 may determine functional dependencies between entities and other semantic relationships.

Consistent with various embodiments, the syntactic relationship identifier 722 may be a computer module that may be configured to identify syntactic relationships in a passage composed of tokens. The syntactic relationship identifier 722 may determine the grammatical structure of sentences such as, for example, which groups of words are associated as phrases and which word is the subject or object of a verb. The syntactic relationship identifier 722 may conform to formal grammar.

In some embodiments, the natural language processor 714 may be a computer module that may parse a document and generate corresponding data structures for one or more portions of the unstructured textual documents/transcripts. For example, in response to receiving an unstructured textual report at the natural language understanding system 712, the natural language processor 714 may output parsed text elements from the report as data structures. In some embodiments, a parsed text element may be represented in the form of a parse tree or other graph structure. To generate the parsed text element, the natural language processor 714 may trigger computer modules 716-722.

In some embodiments, the output of natural language processor 714 may be used by search application 728 to extract contextual information from data source 724 (e.g., a user's calendar, social media, social activity, weather service data, etc.). As used herein, a corpus may refer to one or more data sources. In some embodiments, the data sources 724 may include data warehouses, information corpora, data models, and document repositories. In some embodiments, the data sources 724 may include an information corpus 726. The information corpus 726 may enable data storage and retrieval. In some embodiments, the information corpus 726 may be a storage mechanism that houses a standardized, consistent, clean, and integrated list of contextual data regarding the user's day to day activity related to one or more objects. Data stored in the information corpus 726 may be structured in a way to specifically address reporting and analytic requirements. In some embodiments, the information corpus 726 may be a data repository, a relational database, triplestore, or text index.

In some embodiments, the textual content analyzer 730 may be a computer module that identifies user activity related to one or more objects within textual content. In some embodiments, the textual content analyzer 730 may include an activity identifier 732 and an object analyzer 734. When an unstructured textual document (e.g., text messages related to an activity, calendar data, etc.) is received by the natural language understanding system 712, the textual content analyzer 730 may be configured to analyze the document using natural language processing to identify an activity related to using, carrying, or associating with one or more objects.

Figure 8:
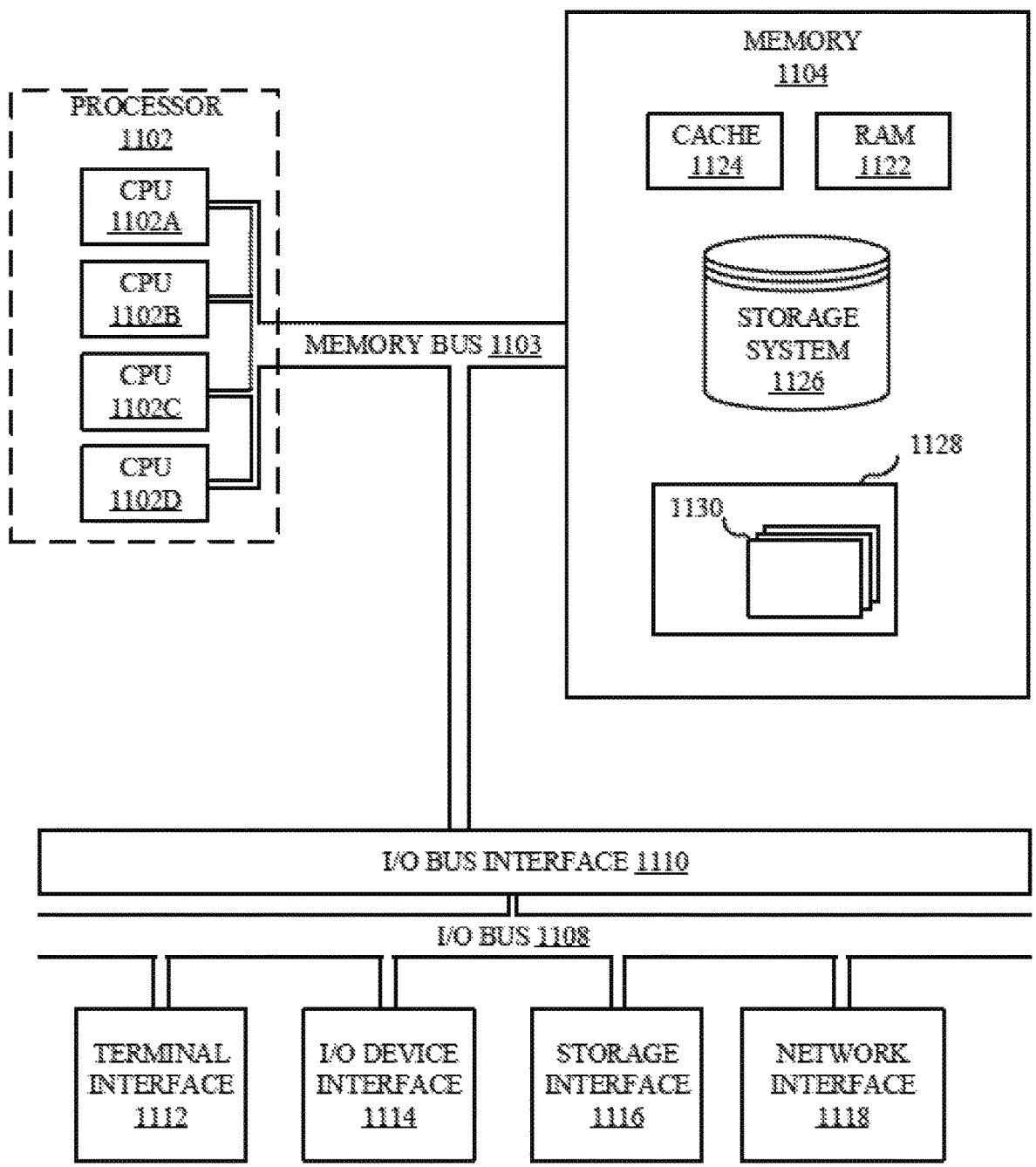
FIG. 8 illustrates a high-level block diagram of an example computer system that may be used in implementing one or more of the methods, tools, and modules, and any related functions, described herein, in accordance with embodiments of the present disclosure.

Referring now to FIG. 8, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200 and 300).

System memory subsystem 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 8 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary computer system 1101. In some embodiments, however, individual components may have greater or lesser complexity than as represented in FIG. 8, components other than or in addition to those shown in FIG. 8 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
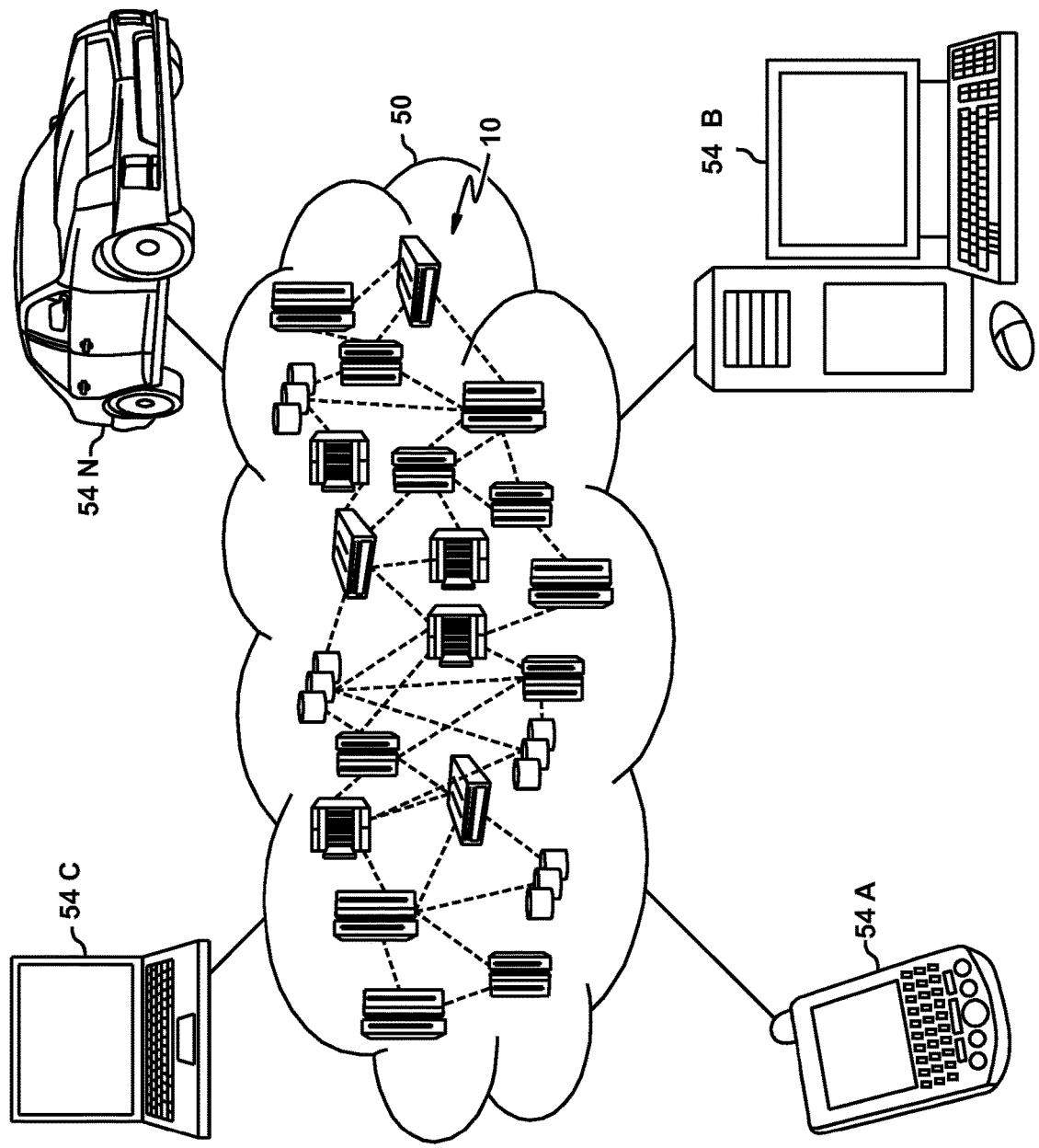
FIG. 9 depicts a cloud computing environment in accordance with embodiments of the present disclosure.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
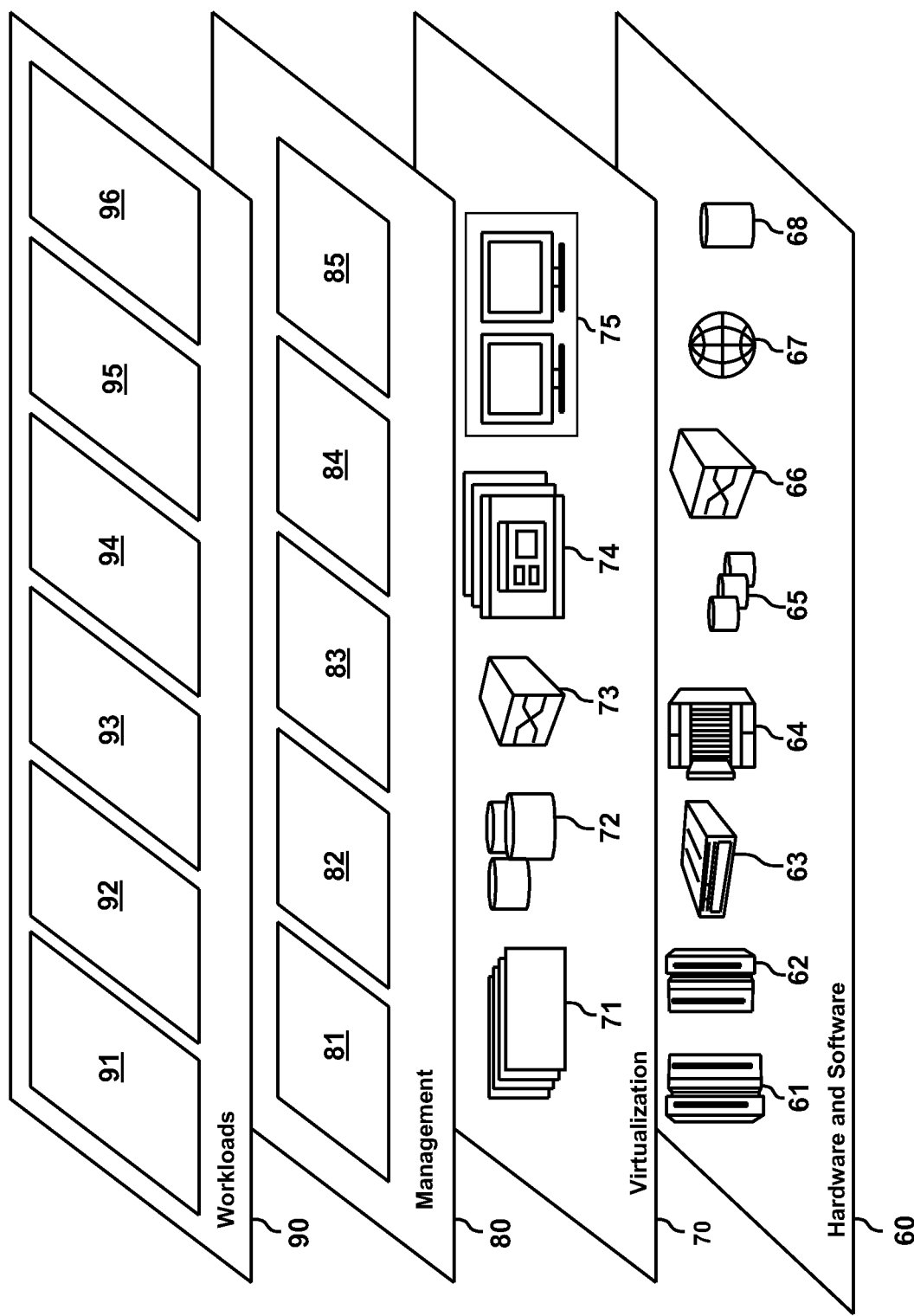
FIG. 10 depicts abstraction model layers in accordance with embodiments of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and object checklist builder software 68 in relation to the object checklist builder 102 of FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   monitoring observation data related to a user from an observation device, wherein the observation device comprises a camera;
   analyzing, using image recognition, the observation data to identify an object carried by the user;
   collecting contextual data related to the identified object and the user, wherein collecting contextual data related to the identified object and the user comprises:
   collecting calendar data from an auxiliary data source associated with the user, wherein the calendar data indicates that the user is scheduled to attend an event requiring the identified object; and
   collecting weather data from a weather service website, wherein the weather data includes a weather forecast occurring during the event;
   comparing the contextual data to a usage pattern threshold related to the identified object and one or more other objects, wherein the one or more other objects have previously been observed being carried by the user; and
   in response to the usage pattern threshold being met, outputting an alert to the user, wherein the alert indicates that an exception to a usage pattern related to the identified object has occurred.

2. The computer-implemented method of claim 1, wherein the alert is selected from the group consisting of:
   notifying the user that a second object related to the identified object is missing;
   notifying the user that a second object unrelated to the identified object has been detected; and
   notifying the user that the identified object is not typically associated with the user on a current occasion.

3. The computer-implemented method of claim 1, further comprising:
   receiving an input from the user in response to the alert, wherein the input is used to verify the accuracy of the alert;
   analyzing the input in relation to the usage pattern of the identified object; and
   updating, based on the analyzing, the usage pattern threshold related to the identified object.

4. The computer-implemented method of claim 1, further comprising:
   collecting a set of training observation data related to the user from the observation device;
   analyzing, using image recognition, the set of training observation data to identify a set of objects carried by the user on a plurality of occasions;
   collecting a set of training contextual data related to the identified set of objects and the user;
   determining a correlation between the identified set of objects and the set of training contextual data to determine a usage pattern for each of the identified set of objects related to the user; and
   generating, based on the correlation, a set of usage pattern thresholds for each of the identified set of objects.

5. The computer-implemented method of claim 4, wherein a connection between a first object and a second object is based, in part, on a number of observations of the first object and the second object being identified together on the plurality of occasions.

6. The computer-implemented method of claim 4, wherein collecting the set of training observation data related to the user from the observation device is performed continuously using a sliding time period window.

7. The computer-implemented method of claim 4, wherein generating the set of usage pattern thresholds for each of the identified set of objects is performed using one or more relationship graphs generated by machine learning.

8. The computer-implemented method of claim 1, wherein the contextual data further comprises at least one selected from the group consisting of: timestamp data; textual data related to the user and the identified object; location data; spoken content; and metadata.

9. The computer-implemented method of claim 1, wherein the contextual data further comprises at least one selected from the group consisting of textual data and spoken content, and wherein the method further comprises analyzing the contextual data using natural language understanding.

10. The computer-implemented method of claim 1, wherein the observation device further comprises one or more devices selected from the group consisting of:
    a radio frequency identification (RFID) reader;
    a smart speaker; and
    a sensor.

11. The computer-implemented method of claim 1, wherein outputting the alert to the user comprises notifying the user to bring a second object to the event requiring the identified object.

12. A system comprising:
    a processor; and
    a computer-readable storage medium communicatively coupled to the processor and storing program instructions which, when executed by the processor, cause the processor to perform a method comprising:
    monitoring observation data related to a user from an observation device, wherein the observation device comprises a camera;
    analyzing, using image recognition, the observation data to identify an object carried by the user;
    collecting contextual data related to the identified object and the user, wherein collecting contextual data related to the identified object and the user comprises:
    collecting calendar data from an auxiliary data source associated with the user, wherein the calendar data indicates that the user is scheduled to attend an event requiring the identified object; and collecting weather data from a weather service website, wherein the weather data includes a weather forecast occurring during the event;

comparing the contextual data to a usage pattern threshold related to the identified object and one or more other objects, wherein the one or more other objects have previously been observed being carried by the user; and in response to the usage pattern threshold being met, outputting an alert to the user, wherein the alert indicates that an exception to a usage pattern related to the identified object has occurred.

13. The system of claim 12, wherein the alert is selected from the group consisting of:

notifying the user that a second object related to the identified object is missing;

notifying the user that a second object unrelated to the identified object has been detected; and notifying the user that the identified object is not typically associated with the user on a current occasion.

14. The system of claim 12, wherein the method performed by the processor further comprises:

collecting a set of training observation data related to the user from the observation device;

analyzing, using image recognition, the set of training observation data to identify a set of objects carried by the user on a plurality of occasions;

collecting a set of training contextual data related to the identified set of objects and the user;

determining a correlation between the identified set of objects and the set of training contextual data to determine a usage pattern for each of the identified set of objects related to the user; and generating, based on the correlation, a set of usage pattern thresholds for each of the identified set of objects.

15. The system of claim 14, wherein a connection between a first object and a second object is based, in part, on a number of observations of the first object and the second object being identified together on the plurality of occasions.

16. A computer program product comprising a computer-readable storage medium having program instructions embodied therewith, the program instructions executable by a processor to cause the processor to perform a method comprising:

monitoring observation data related to a user from an observation device, wherein the observation device comprises a camera;

analyzing, using image recognition, the observation data to identify an object carried by the user;

collecting contextual data related to the identified object and the user, wherein collecting contextual data related to the identified object and the user comprises:

collecting calendar data from an auxiliary data source associated with the user, wherein the calendar data indicates that the user is scheduled to attend an event requiring the identified object; and collecting weather data from a weather service website, wherein the weather data includes a weather forecast occurring during the event;

comparing the contextual data to a usage pattern threshold related to the identified object and one or more other objects, wherein the one or more other objects have previously been observed being carried by the user; and in response to the usage pattern threshold being met, outputting an alert to the user, wherein the alert indicates that an exception to a usage pattern related to the identified object has occurred.

17. The computer program product of claim 16, wherein the alert is selected from the group consisting of:

notifying the user that a second object related to the identified object is missing;

notifying the user that a second object unrelated to the identified object has been detected; and notifying the user that the identified object is not typically associated with the user on a current occasion.

18. The computer program product of claim 16, wherein the method performed by the processor further comprises:

collecting a set of training observation data related to the user from the observation device;

analyzing, using image recognition, the set of training observation data to identify a set of objects carried by the user on a plurality of occasions;

collecting a set of training contextual data related to the identified set of objects and the user;

determining a correlation between the identified set of objects and the set of training contextual data to determine a usage pattern for each of the identified set of objects related to the user; and generating, based on the correlation, a set of usage pattern thresholds for each of the identified set of objects.

19. The computer program product of claim 18, wherein a connection between a first object and a second object is based, in part, on a number of observations of the first object and the second object being identified together on the plurality of occasions.

* * * * *